(12) United States Patent
Cross et al.

(10) Patent No.: US 8,997,085 B2
(45) Date of Patent: Mar. 31, 2015

(54) IMAGE DELTA-BASED UPGRADE OF COMPLEX STACK IN SOFTWARE APPLIANCE

(75) Inventors: Micah Morton Cross, Rocky Mount, NC (US); Eugene M. Stuart, Galway (IE)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 13/168,445

(22) Filed: Jun. 24, 2011

(65) Prior Publication Data
US 2012/0331454 A1 Dec. 27, 2012

(51) Int. Cl.
*G06F 9/44* (2006.01)

(52) U.S. Cl.
CPC .... *G06F 8/68* (2013.01); *G06F 8/30* (2013.01)
USPC ............................ 717/170; 717/121; 717/169

(58) Field of Classification Search
CPC ............... G06F 8/60–8/61; G06F 8/65; G06F 8/67–8/68; G06F 8/71; G06F 11/1433
See application file for complete search history.

(56) References Cited

U.S. PATENT DOCUMENTS

| | | | | | |
|---|---|---|---|---|---|
| 5,586,304 | A | * | 12/1996 | Stupek et al. | 717/170 |
| 5,960,189 | A | * | 9/1999 | Stupek et al. | 717/169 |
| 6,389,592 | B1 | * | 5/2002 | Ayres et al. | 717/172 |
| 6,606,618 | B2 | * | 8/2003 | Delo | 1/1 |
| 6,804,663 | B1 | * | 10/2004 | Delo | 1/1 |
| 7,310,653 | B2 | * | 12/2007 | Coyle et al. | 1/1 |
| 7,367,027 | B1 | * | 4/2008 | Chen et al. | 717/168 |
| 7,590,981 | B2 | * | 9/2009 | Gupta et al. | 717/168 |
| 7,600,021 | B2 | | 10/2009 | Schottland et al. | 709/226 |
| 7,600,225 | B2 | * | 10/2009 | Sliger et al. | 717/169 |
| 7,694,291 | B2 | * | 4/2010 | Chen et al. | 717/162 |
| 8,214,393 | B2 | * | 7/2012 | Joshi et al. | 707/780 |
| 8,291,380 | B2 | * | 10/2012 | Bandyopadhyay et al. | 717/121 |
| 8,341,113 | B2 | * | 12/2012 | Meller et al. | 707/609 |
| 8,418,167 | B2 | * | 4/2013 | Meller et al. | 717/169 |
| 8,434,066 | B2 | * | 4/2013 | Sharma | 717/126 |
| 8,453,138 | B2 | * | 5/2013 | Meller et al. | 717/170 |
| 8,464,243 | B2 | * | 6/2013 | Yu et al. | 717/173 |
| 8,561,049 | B2 | * | 10/2013 | Peleg et al. | 717/168 |
| 8,612,961 | B2 | * | 12/2013 | Stewart | 717/168 |
| 8,745,611 | B2 | * | 6/2014 | Saraf et al. | 717/170 |
| 2001/0032199 | A1 | * | 10/2001 | Delo | 707/3 |
| 2002/0066093 | A1 | * | 5/2002 | Yen et al. | 717/169 |
| 2004/0168165 | A1 | * | 8/2004 | Kokkinen | 717/168 |
| 2004/0237081 | A1 | * | 11/2004 | Homiller | 717/170 |
| 2005/0172284 | A1 | * | 8/2005 | Dandekar et al. | 717/175 |
| 2006/0080651 | A1 | * | 4/2006 | Gupta et al. | 717/169 |
| 2007/0050762 | A1 | * | 3/2007 | Chen et al. | 717/169 |
| 2007/0294685 | A1 | * | 12/2007 | Oh | 717/168 |
| 2007/0294686 | A1 | * | 12/2007 | Oh | 717/168 |
| 2008/0098383 | A1 | * | 4/2008 | Waldmann | 717/170 |

(Continued)

*Primary Examiner* — Tuan Q. Dam
*Assistant Examiner* — Zheng Wei
(74) *Attorney, Agent, or Firm* — VanLeeuwen & VanLeeuwen; William J. Stock

(57) ABSTRACT

An approach is provided in which a host system identifies a set of differences between a first version of a software product and a second version of the software product. The set of differences include different file system files, database differences, and configuration differences. The host system creates database utilities and configuration utilities that correspond to the database differences and configuration differences, respectively. In turn, the host system creates an executable upgrade image that includes the different file system files, the database utilities, and the configuration utilities.

20 Claims, 8 Drawing Sheets

(56) References Cited

U.S. PATENT DOCUMENTS

| | | |
|---|---|---|
| 2008/0163189 A1* | 7/2008 | Chen et al. .................... 717/168 |
| 2009/0144718 A1 | 6/2009 | Boggs et al. .................. 717/170 |
| 2009/0222806 A1 | 9/2009 | Faus et al. .................... 717/168 |
| 2009/0300076 A1 | 12/2009 | Friedman et al. ............. 707/203 |
| 2009/0313608 A1* | 12/2009 | Sharma ........................ 717/126 |
| 2009/0328024 A1* | 12/2009 | Li et al. ........................ 717/169 |
| 2010/0023934 A1* | 1/2010 | Sheehan et al. ............... 717/168 |
| 2010/0299653 A1* | 11/2010 | Iyer et al. ..................... 717/121 |
| 2011/0041124 A1* | 2/2011 | Fishman et al. .............. 717/170 |
| 2011/0047537 A1* | 2/2011 | Yu et al. ....................... 717/173 |
| 2011/0093513 A1* | 4/2011 | Joshi et al. .................... 707/804 |
| 2011/0179408 A1* | 7/2011 | Nakamura .................... 717/170 |
| 2012/0102478 A1* | 4/2012 | Jeong ............................ 717/170 |
| 2014/0026129 A1* | 1/2014 | Powell et al. ................. 717/170 |
| 2014/0282473 A1* | 9/2014 | Saraf et al. .................... 717/170 |

\* cited by examiner

IMAGE DELTA-BASED UPGRADE OF COMPLEX STACK IN SOFTWARE APPLIANCE

BACKGROUND

The present disclosure relates to upgrading a software appliance at a user system. More particularly, the present disclosure relates to creating an executable upgrade image at a host system based upon a software appliance's version differences, and providing the executable upgrade image to the user system, which executes the executable upgrade image to upgrade the user system's software appliance.

Software appliance products today may be based on complex middleware and many other components that are typically skill intensive, time consuming, and error prone to upgrade. Rich software appliances may also include an ISM software stack (Information Technology Service Management) that, for example, may include software pertaining to a full enterprise database, an application server, multiple applications, an operating system with extensions, and configuration information. When these software appliances require version upgrades, the version upgrades are typically very user-intensive and require multiple installers that are dependent upon other files to complete a software appliance upgrade.

BRIEF SUMMARY

According to one embodiment of the present disclosure, an approach is provided in which a host system identifies a set of differences between a first version of a software product and a second version of the software product. The set of differences include different file system files, database differences, and configuration differences. The host system creates database utilities and configuration utilities that correspond to the database differences and configuration differences, respectively. In turn, the host system creates an executable upgrade image that includes the different file system files, the database utilities, and the configuration utilities.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
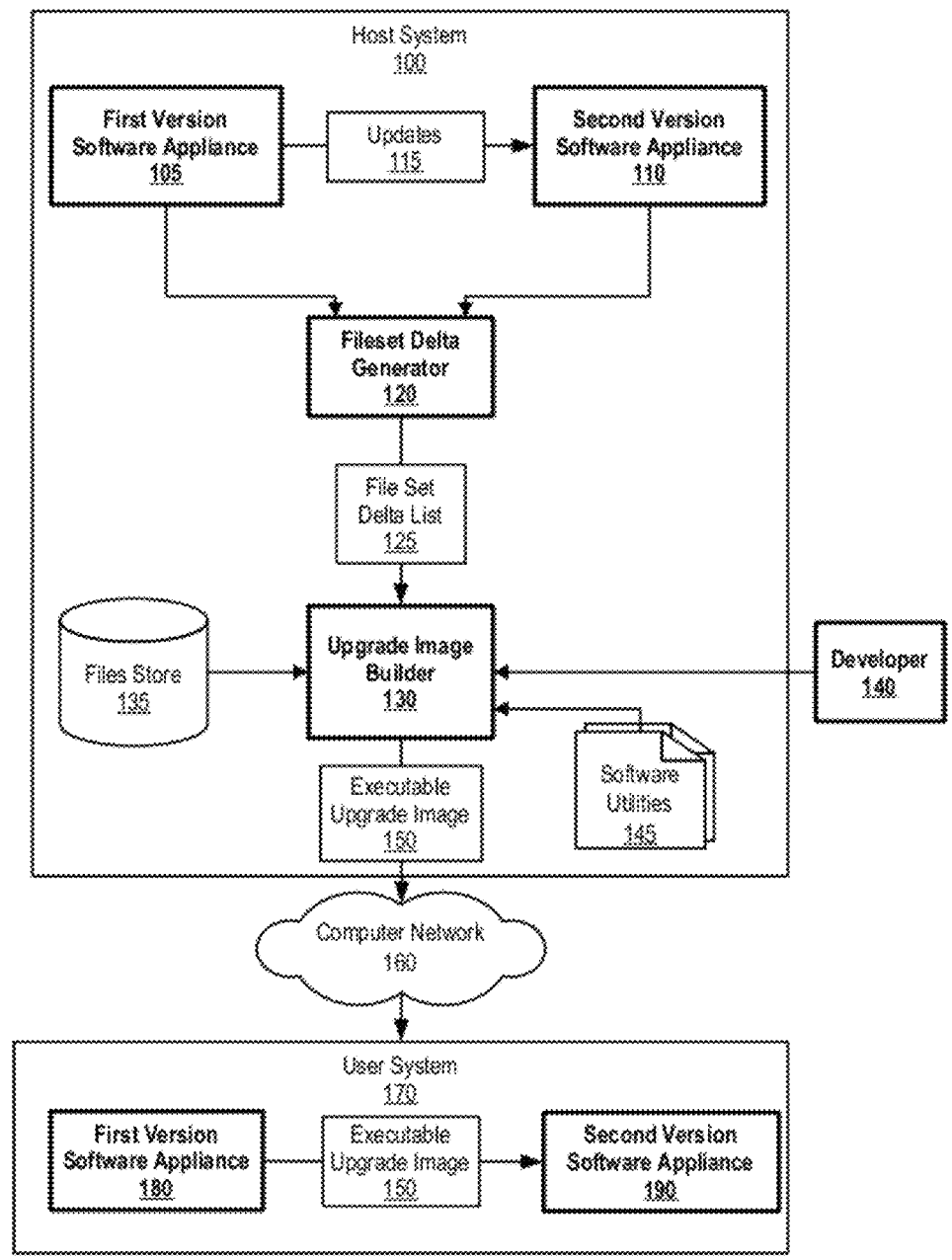
FIG. 1 is a diagram showing a host system generating a self-contained executable upgrade image that a user system executes to upgrade the user's software appliance to a newer version.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a host system generating a self-contained executable upgrade image that a user system executes to upgrade the user's software appliance to a newer version. As discussed herein, a software appliance is pre-configured/pre-deployed stack of software applications, content information, and configuration information that allows a customer to quickly deploy a solution and achieve operational value.

Host system 100 includes a first version of a software appliance (first version software appliance 105), to which host system applies updates 115, resulting in a newer software version (second version software appliance 110). Updates 115 may be, for example, installation updates, hotfixes, upgrades, scripts/utilities updates, configuration updates, or database updates.

Host system 100 passes first version software appliance 105 and second version software appliance 110 to file set delta generator 120, which generates file set delta list 125, such as by using an "rsync" command. File set delta list 125 includes a list of files that are different between first version software appliance 105 and second version software appliance 110, such as, for example differences between business logic application files. Host system passes file set delta list 125 to upgrade image builder 130 to commence building executable upgrade image 150. In one embodiment, file set delta generator 120 and/or upgrade image builder 130 may be, for example, software routines executing on one of host system 100's processors.

Upgrade image builder 130 uses file set delta list 125 to identify which files to include in executable upgrade image 150 to pass on to user system 170. In one embodiment, upgrade image builder 130 analyzes file set delta list 125 and removes files from the list that include configuration information or database content information, such as that pertaining to a relational database. For example, file set delta list 125 may include XML configuration files, which the host system removes in order to prevent overwriting a user's current configuration settings when the user executes executable upgrade image 150. In another example, file set delta list 125 may include database content files, which the host system removes in order to prevent overwriting a user's database when the user executes executable upgrade image 150. Once upgrade image builder 130 identifies the appropriate files to include in executable upgrade image 150, upgrade image builder 130 retrieves the files from files store 135 and compresses them into executable upgrade image 150 (see FIG. 4 and corresponding text for further details).

Next, developer 140 provides input to upgrade image builder to generate software utilities 145 to include in upgrade image builder 130. Such software utilities may include, for example, a database utility to reformat the customer's relational database to a newer format (e.g., DB1 to DB2); additional scripts/automation steps for an end-product specific upgrade; and/or a configuration utility to update a customer's configuration information. In one embodiment, upgrade image builder 130 may include language content into executable upgrade image 150 in order to allow an end user to select different languages and/or upgrade previous language files (see FIGS. 2, 4, and corresponding text for further details).

Once complete, upgrade image builder 130 deploys executable upgrade image 150 to user system 170 through computer network 160. User system 170 retrieves first version software appliance 180 from local storage, and runs executable upgrade image 150 on first version software appliance 180 to create second version software appliance 190 on user system 170. For example, a user may "unzip" executable upgrade image 150 onto first version software appliance 180; launch a single upgrade utility included in the executable upgrade image; and fill in a few prompts (e.g., registration information, etc.). This alleviates the user from having to launch many separate installers to upgrade a middleware software appliance, each requiring their own prompts and additional points of failure (see FIG. 5 and corresponding text for further details).

Figure 2:
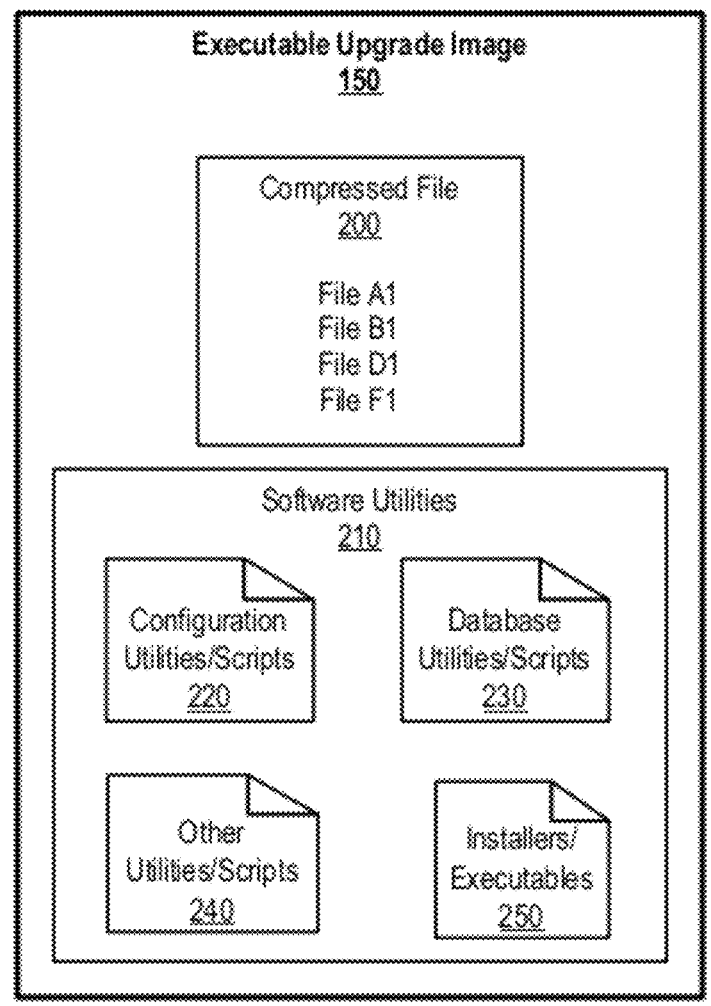
FIG. 2 is a diagram showing various files and utilities that are included in an executable upgrade image.

FIG. 2 is a diagram showing various files and utilities that are included in executable upgrade image 150. Executable upgrade image 150 includes compressed file 200, which includes files that are different between a first version and a second version of a software appliance. The files may be updates to existing files (version 1.2.4 to version 1.2.5) to new files altogether that were not included in the software appliance's first version. In one embodiment, as discussed above, compressed file 200 may be free from different files that relate to configuration content changes and/or database content changes. These types of differences may be handled through software utilities 210 in order to make required changes on the user's system while preserving the user's configuration and database content.

Software utilities 210 may include configuration utilities/scripts 220 that, when executed, update the user's configuration files, such as XML configuration files. Software utilities 210 may also include database utilities/scripts 230 that, when executed, update the user's relational database files, such as reformatting the user's data to a newer version.

In addition, software utilities 210 may include other utilities/scripts 240 and installers/executables 250. Other utilities/scripts 240 may be for updating or loading new language files onto the user's computer system. Installers/executables 250 may include installer programs or other programs that enable executable upgrade image 150 to be a self-contained image that may be independently executed on a user's computer system. As opposed to a traditional personal-computer type of software upgrade, executable upgrade image 150 upgrades databases, middleware and applications, and configuration information while retaining existing customer data and configuration.

Figure 3:
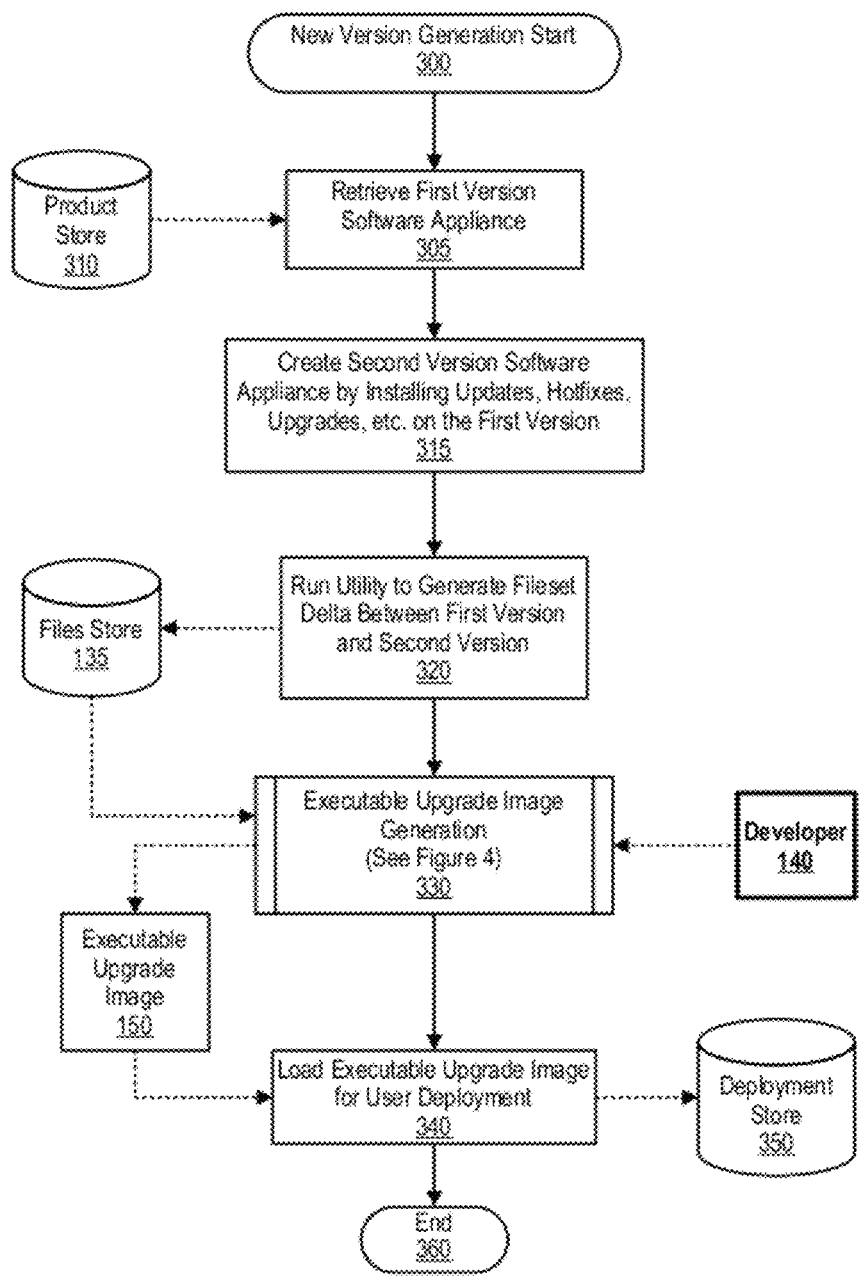
FIG. 3 is a flowchart showing steps taken in generating a self-contained executable upgrade image.

FIG. 3 is a flowchart showing steps taken in generating a self-contained executable upgrade image. Processing commences at 300, whereupon a host system retrieves a first version of a software appliance from product store 310. For example, the first version may be "version 1.0," which includes files, commands, databases, etc. associated with the first version of the software appliance. Product store 310 may be stored on a volatile or nonvolatile storage area, such as computer memory or a computer hard drive.

At step 315, the host system creates a second version of the software appliance by installing updates, hotfixes, upgrades, etc. to the first version. The host system stores the second image in image store 310 (step 320), which may include modified file set files, new files, different database formatting requirements, different configuration setting requirements, etc.

Next, at step 320, the host system runs a utility, such as "rsync," to generate a file set delta list between the first version software appliance and the second version software appliance. For example, file set delta list may include different versions of individual files (e.g., version 1.2 versus version 1.3), different configuration content files, and/or different database content files.

Figure 4:
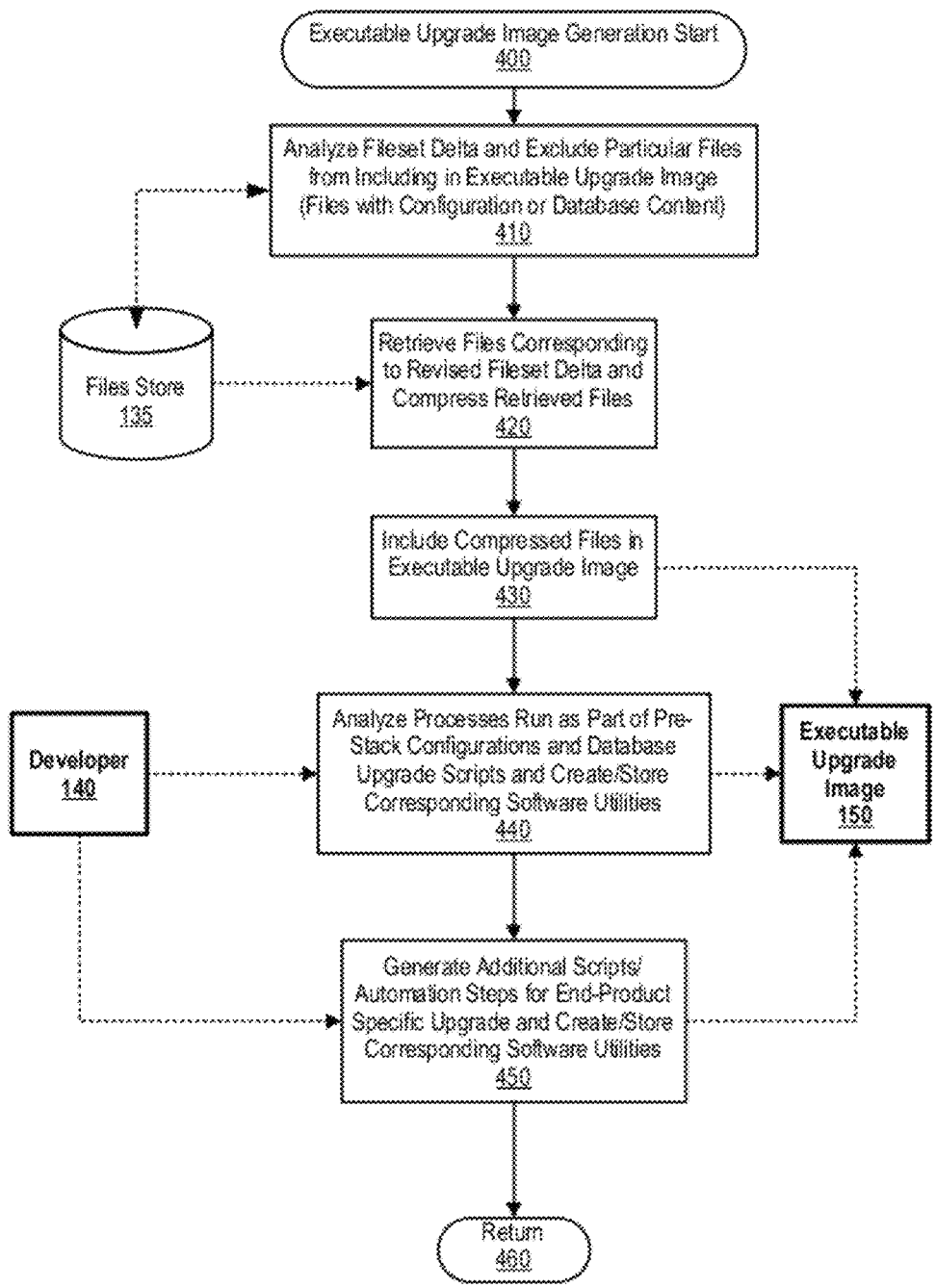
FIG. 4 is a flowchart showing steps taken in a host system creating a self-contained executable upgrade image based upon a first version software appliance and a second version software appliance.

Next, the host system proceeds through a series of steps with, in one embodiment, assistance from developer 140, to generate executable upgrade image 150, which includes files and utilities that allow an end user to self-sufficiently execute in order to upgrade the user's software appliance version (pre-defined process block 360, see FIG. 4 and corresponding text for further details).

Figure 5:
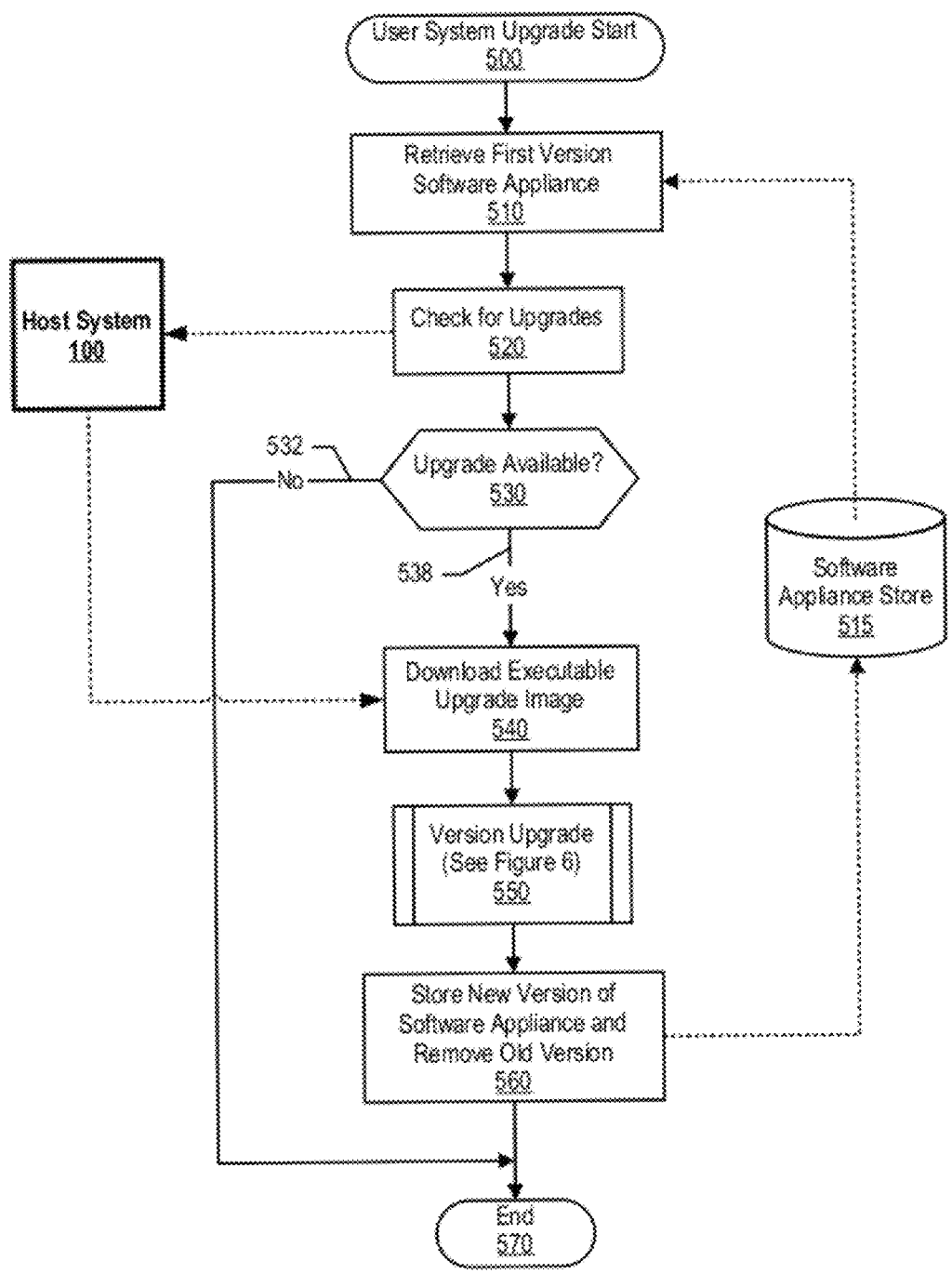
FIG. 5 is a flowchart showing steps taken in a user system using a self-contained executable upgrade image to upgrade a first version software appliance to a second version software appliance.

At step 340, the host system loads executable upgrade image 150 onto deployment store 350 for user deployment (see FIG. 5 and corresponding text for further details). Host system processing ends at 360.

FIG. 4 is a flowchart showing steps taken in a host system creating a self-contained executable upgrade image based upon a first version software appliance and a second version software appliance. Host processing commences at 400, whereupon the host system accesses a file set delta list at step 410, which was created in step 350 in FIG. 3. As discussed earlier, the file set delta list includes a list of files that are different between the first version software appliance and the second version software appliance. The host system performs analysis such as checking for files on the file set delta list that include configuration content or database content. For example, the file set delta list may include XML configuration files or database content files. The host system removes these files from the file set list in order to prevent, for example, overwriting a user's current configuration settings or overwriting a user's relational database when a user executes executable upgrade image 150 to upgrades the user's software appliance version.

At step 420, the host system retrieves files from files store 135 that correspond to the remaining files on the revised file set delta list (e.g., no configuration content-based files or database content-based files). At step 430, the host system compresses the retrieved files (e.g., into a zip container) and includes them in executable upgrade image 150.

Next, at step 440, the host system, with guidance from developer 140, analyzes pre-requirement stack processes that are required for upgrading software appliance versions, such as configuration upgrade scripts and/or database upgrade scripts. For example, the customer's database may be required to upgrade to a newer format (e.g., DB1 to DB2) in order for the second version software appliance to function effectively. As such, the host system generates utility programs to accommodate such pre-requirement stack processes requirements.

At step 450, the host system, with guidance from developer 140, creates additional software utilities and automation steps in order to make executable upgrade image 150 an end-product specific upgrade. For example, the host system may include language content into executable upgrade image 150 in order to allow an end user to select different languages and/or upgrade previous language files. Processing returns at 460.

FIG. 5 is a flowchart showing steps taken in a user system using a self-contained executable upgrade image to upgrade a first version software appliance to a second version software appliance. User system processing commences at 500, whereupon the user system retrieves a first version software appliance from software appliance store 515 at step 510. Next, at step 520, the user system queries host system 100 for available upgrades pertaining to the retrieved software appliance. A determination is made as to whether host system 100 has available upgrades (decision 530). If no upgrades are available, decision 530 branches to "No" branch 532, bypassing upgrade steps. On the other hand, if host system 100 has an upgrade available, decision 530 branches to "Yes" branch 538, whereupon the user system, downloads the executable upgrade image from host system 100 at step 540.

Figure 6:
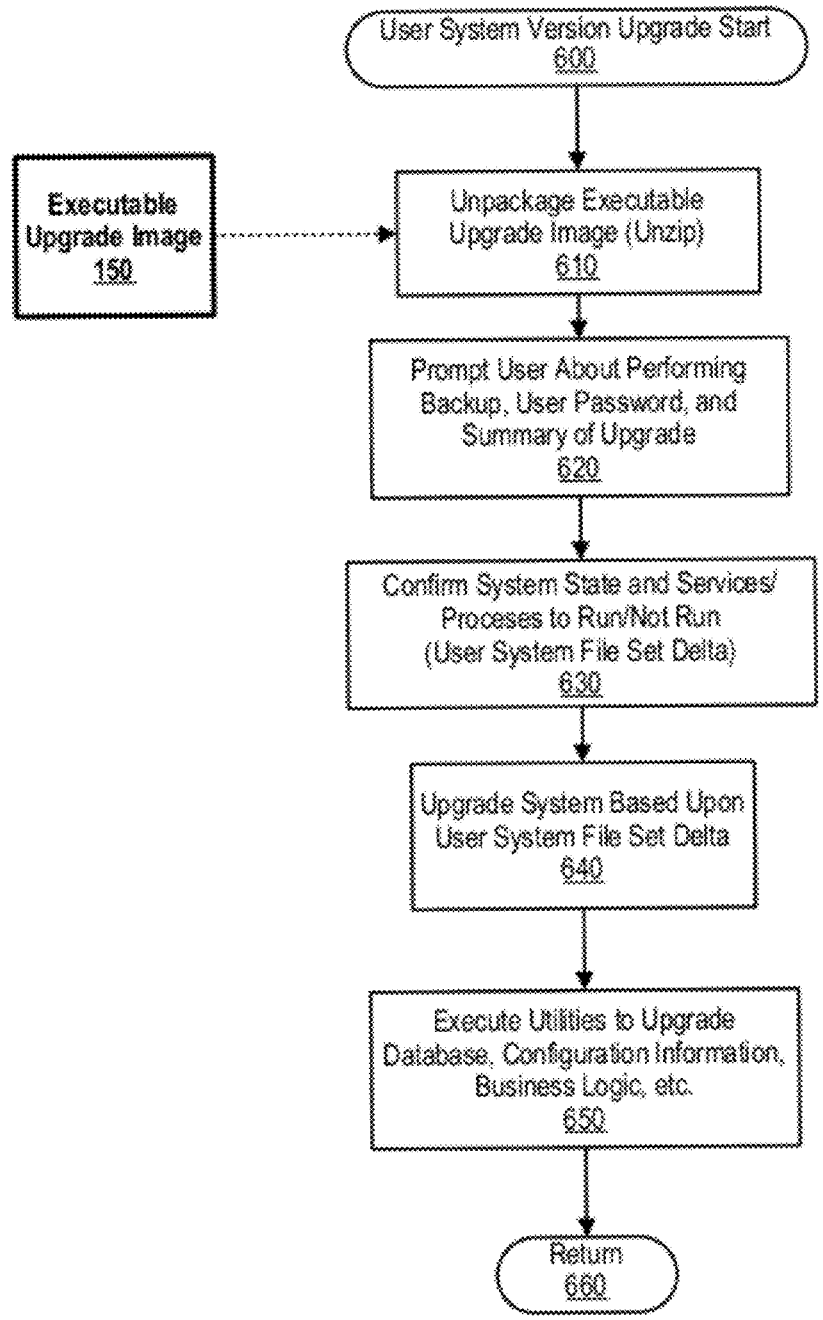
FIG. 6 is a flowchart showing steps taken in an executable upgrade image performing a version upgrade to a user system's software appliance.

The user system executes the executable upgrade image, which upgrades the software appliance to a newer version (pre-defined process block 550, see FIG. 6 and corresponding text for further details). For example, a user may unzip the executable upgrade image onto the software appliance, launch a single upgrade utility included in the executable upgrade image, and fill in a few prompts (e.g., registration information, etc.). This alleviates the user from launching many separate installers that each require their own prompts and additional points of failure.

The user system stores the new version of the software appliance in software appliance store 515 and removes the old version at step 560. Upgrade processing ends at 570.

FIG. 6 is a flowchart showing steps taken in an executable upgrade image performing a version upgrade to a user system's software appliance. User system processing commences at 600, whereupon the user system unpackages executable upgrade image 150 (e.g., via unzip command, step 610). The executable upgrade image executes and prompts the user for answers to questions such as whether to perform a backup prior to upgrading a software appliance version, a user password, and also provides a user with a summary of the upgrade (step 620).

Next, at step 630, the executable upgrade confirms the user system's state and confirms services/processes to execute (e.g., pre-requisites) to create a user system file set delta. At step 640, the executable upgrade commences the version upgrade and performs tasks such as updating file permissions, replacing files, adding files, and deleting files based on the file set delta-analysis.

The executable upgrade, at step 650, completes the version upgrade by executing utilities (e.g., software utilities, configuration utilities, command line installers, etc.) to upgrade database information (relational database information), configuration information, and business logic that may require both file system and database/configuration file changes. Processing returns at 660.

Figure 7:
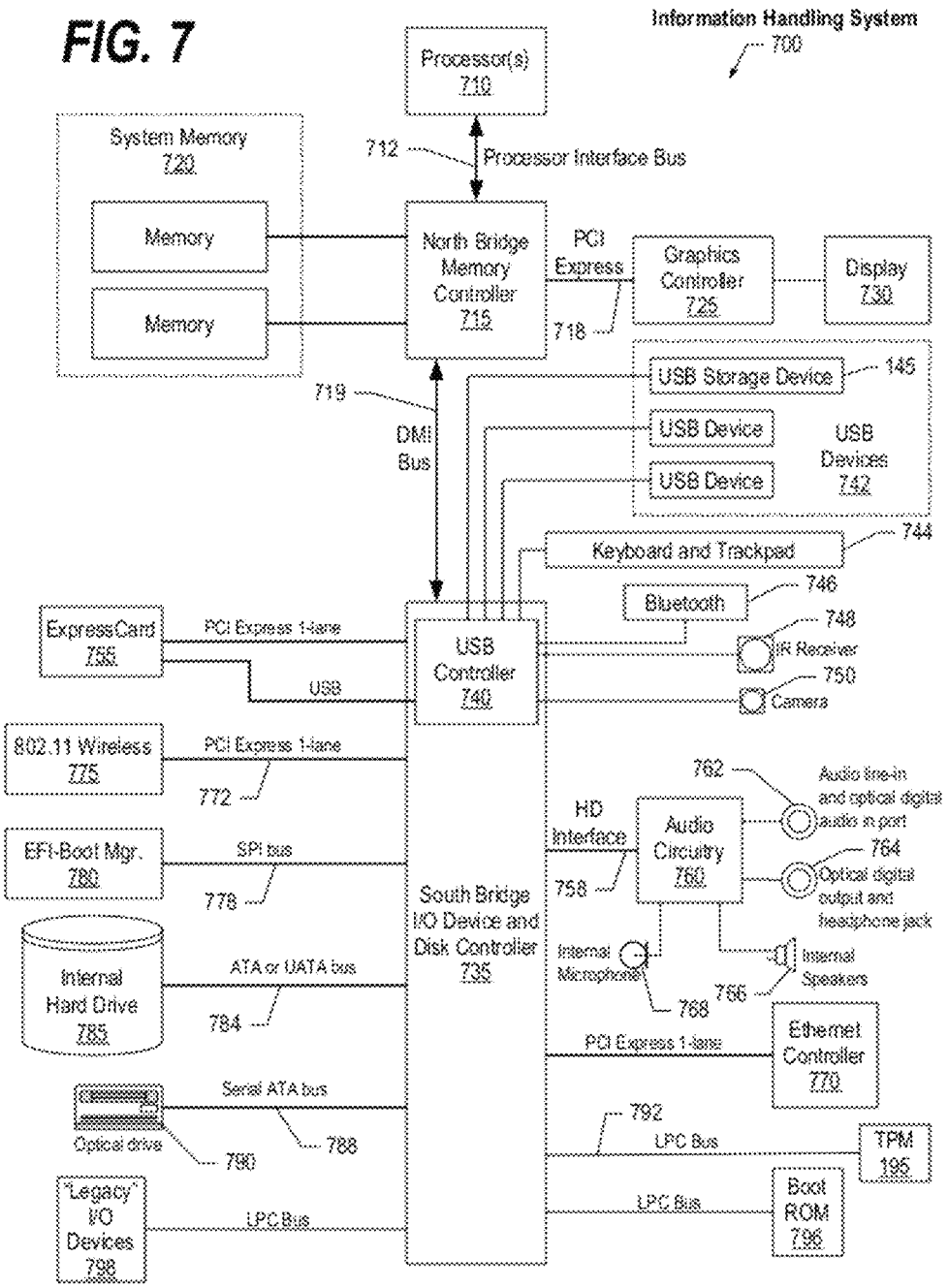
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
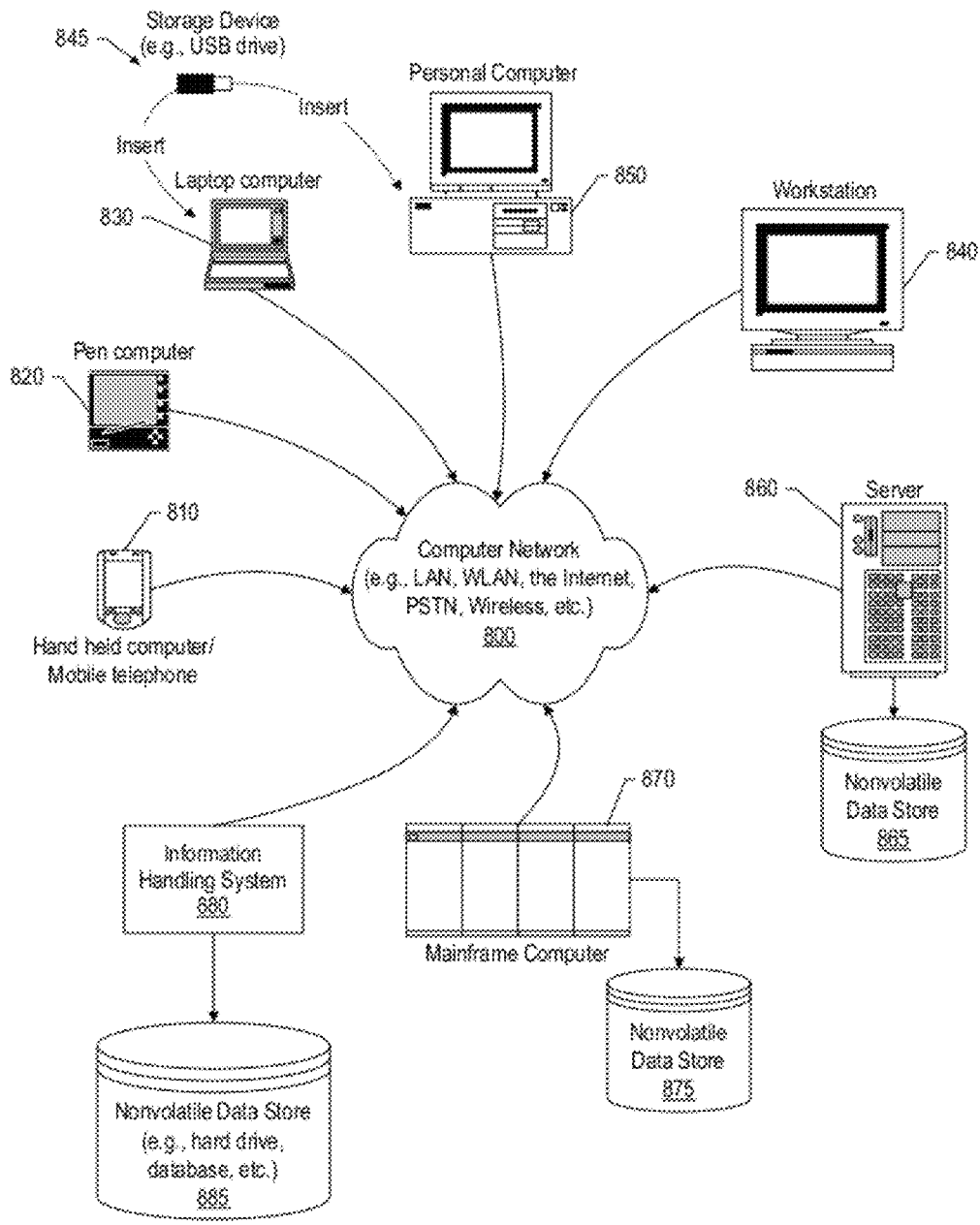
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    identifying a set of differences between a first version of a software product and a second version of the software product, wherein the set of differences include one or more different file system files, one or more database differences corresponding to database content, and one or more configuration differences corresponding to configuration content;
    creating one or more database utilities that correspond to the one or more database differences and creating one or more configuration utilities that correspond to the one or more configuration differences; and
    creating an executable upgrade image that includes the one or more different file system files, the one or more database utilities, and the one or more configuration utilities.

2. The method of claim 1 wherein, prior to creating the executable upgrade image, the method further comprises:
    selecting one or more of the one or more different file system files that correspond to the configuration content or the database content; and
    removing the selected one or more different file system files from the one or more different file system files.

3. The method of claim 1 wherein executing the executable upgrade image causes an upgrade of the product from the first version of the product to the second version of the product.

4. The method of claim 3 wherein the software product is a middleware software appliance that includes a complex software stack that corresponds to a plurality of software applications and one or more relational databases, and wherein executing the executable upgrade image upgrades one or more of the relational databases.

5. The method of claim 4 wherein:
    the executable upgrade image is created on a host system and the executable upgrade image is executed on a user system; and
    the executable upgrade image is self-contained and independently executed on the user system.

6. The method if claim 5 wherein the one or more configuration utilities upgrades one or more user configuration files on the user system.

7. The method of claim 1 further comprising:
    retrieving a first image of the product that corresponds to the first version of the product;
    installing one or updates to the first image, resulting in a second image that corresponds to the second version of the product;
    comparing the first image with the second image; and
    identifying the one or more different file system files in response to the comparing.

8. An information handling system comprising:
    one or more processors;
    a memory coupled to at least one of the processors;
    a set of computer program instructions stored in the memory and executed by at least one of the processors in order to perform actions of:
        identifying a set of differences between a first version of a software product and a second version of the software product, wherein the set of differences include one or more different file system files, one or more database differences corresponding to database content, and one or more configuration differences corresponding to configuration content;

creating one or more database utilities that correspond to the one or more database differences and creating one or more configuration utilities that correspond to the one or more configuration differences; and creating an executable upgrade image that includes the one or more different file system files, the one or more database utilities, and the one or more configuration utilities.

9. The information handling system of claim 8 wherein, prior to creating the executable upgrade image, the processors perform additional actions comprising:

selecting one or more of the one or more different file system files that correspond to the configuration content or the database content; and removing the selected one or more different file system files from the one or more different file system files.

10. The information handling system of claim 8 wherein executing the executable upgrade image causes an upgrade of the product from the first version of the product to the second version of the product.

11. The information handling system of claim 10 wherein the software product is a middleware software appliance that includes a complex software stack that corresponds to a plurality of software applications and one or more relational databases, and wherein executing the executable upgrade image upgrades one or more of the relational databases.

12. The information handling system of claim 11 wherein:

the executable upgrade image is created on a host system and the executable upgrade image is executed on a user system; and the executable upgrade image is self-contained and independently executed on the user system.

13. The information handling system if claim 12 wherein the one or more configuration utilities upgrades one or more user configuration files on the user system.

14. The information handling system of claim 8 wherein the processors perform additional actions comprising:

retrieving a first image of the product that corresponds to the first version of the product;

installing one or updates to the first image, resulting in a second image that corresponds to the second version of the product;

comparing the first image with the second image; and identifying the one or more different file system files in response to the comparing.

15. A computer program product stored in a non-transitory computer readable storage medium, comprising computer program code that, when executed by an information handling system, causes the information handling system to perform actions comprising:

identifying a set of differences between a first version of a software product and a second version of the software product, wherein the set of differences include one or more different file system files, one or more database differences corresponding to database content, and one or more configuration differences corresponding to configuration content;

creating one or more database utilities that correspond to the one or more database differences and creating one or more configuration utilities that correspond to the one or more configuration differences; and creating an executable upgrade image that includes the one or more different file system files, the one or more database utilities, and the one or more configuration utilities.

16. The computer program product of claim 15 wherein, prior to creating the executable upgrade image, the information handling system performs additional actions comprising:

selecting one or more of the one or more different file system files that correspond to the configuration content or the database content; and removing the selected one or more different file system files from the one or more different file system files.

17. The computer program product of claim 15 wherein executing the executable upgrade image causes an upgrade of the product from the first version of the product to the second version of the product.

18. The computer program product of claim 17 wherein the software product is a middleware software appliance that includes a complex software stack that corresponds to a plurality of software applications and one or more relational databases, and wherein executing the executable upgrade image upgrades one or more of the relational databases.

19. The computer program product of claim 18 wherein:

the executable upgrade image is created on a host system and the executable upgrade image is executed on a user system;

the executable upgrade image is self-contained and independently executed on the user system; and the one or more configuration utilities upgrades one or more user configuration files on the user system.

20. The computer program product of claim 15 wherein the information handling system performs additional actions comprising:

retrieving a first image of the product that corresponds to the first version of the product;

installing one or updates to the first image, resulting in a second image that corresponds to the second version of the product;

comparing the first image with the second image; and identifying the one or more different file system files in response to the comparing.

* * * * *